(No Model.)

R. L. MILLSPAUGH.
WHEEL FOR SULKY PLOWS.

No. 286,468. Patented Oct. 9, 1883.

Witnesses:
Phil C. Dietrich
G. B. Harris

Inventor:
R. L. Millspaugh,
By J. O. McCleary,
Attorney.

UNITED STATES PATENT OFFICE.

ROLLA L. MILLSPAUGH, OF WINFIELD, KANSAS.

WHEEL FOR SULKY-PLOWS.

SPECIFICATION forming part of Letters Patent No. 286,468, dated October 9, 1883.

Application filed April 14, 1883. (No model.)

*To all whom it may concern:*

Be it known that I, ROLLA L. MILLSPAUGH, of Winfield, in the county of Cowley and State of Kansas, have invented certain new and useful Improvements in Wheels for Sulky-Plows; and I do hereby declare the following to be a full, clear, and exact description of the invention, such as will enable others skilled in the art to which it pertains to make and use the same.

My invention relates to wheels for sulky-plows, the object being to provide such wheels with a removable circular cutter adapted to serve as a stalk-cutter.

Heretofore various forms of cutting-flanges have been formed integral with colters and wheels of plows to cut sods and assist in guiding the plow. The principal objections to these constructions are that they render necessary the removal of the entire wheel in case of breakage or other damage to the cutting-flange, and they necessitate the constant use of the flange in plowing.

My improvement is designed to remedy these defects, and to provide a circular cutter adapted to be applied to any form of wheel, and removed when the work to be done does not require the cutter.

Figure 1:
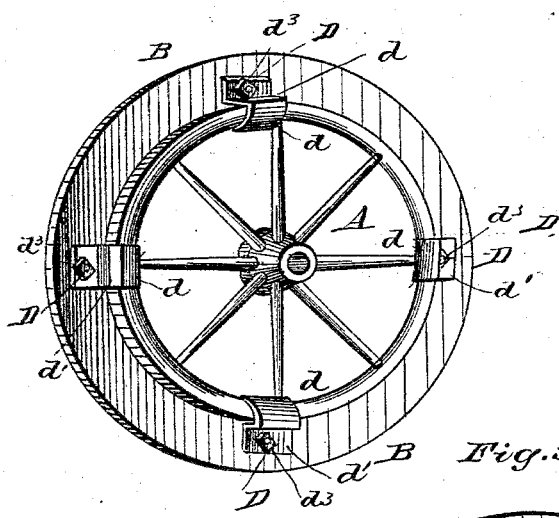
Figure 2:
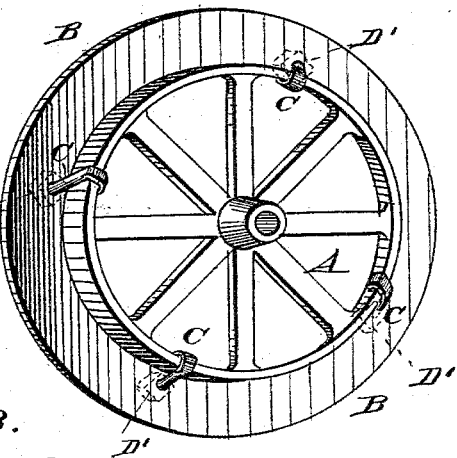
Figure 3:
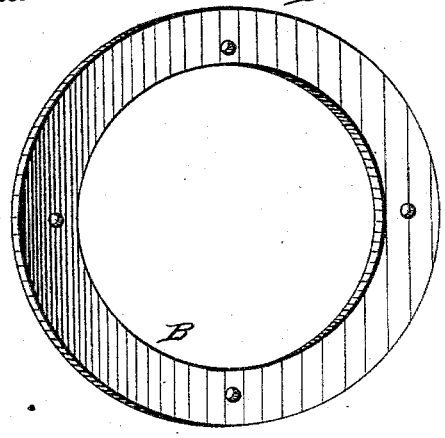
Figure 4:
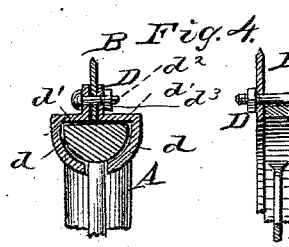

In the drawings, Figure 1 represents an elevation of a wheel provided with one form of my improvement. Fig. 2 is a similar view of another form of the same. Fig. 3 illustrates the cutter detached, and Fig. 4 represents transverse sections of Figs. 1 and 2.

A represents a wheel of a sulky-plow.

B represents the circular cutting-blade, adapted to be secured either centrally upon the periphery of the wheel or to one side of the same by any preferred securing devices.

In Fig. 1 the cutter is shown secured centrally to the periphery of the wheel by means of two-part clamps D, each part $d$ of the clamp being bent to engage the felly, and then bent at a right angle, as shown at $d'$, to rest upon the periphery of the wheel and upon the cutter. The outer end of each clamp-section is perforated to receive a bolt, $d^2$, which passes through the ends of the clamp-sections and through the cutter, and is held by a nut, $d^3$, to securely retain the cutter B in place upon the wheel.

In Fig. 2 I have shown a series of clamping-fingers, C, hooked or bent to embrace the felly or edge of the wheel to secure the cutter to the side of the wheel, and projecting through the cutter, and held by nuts D'. These securing devices are preferably arranged diametrically opposite one another, to securely clamp the cutter and resist strain in all directions.

It will be observed that no boring of the wheel is required, and that the cutter attachment may be applied to any form of wheel.

An important advantage of the improvement is found in the fact that where the cutting-flange is not required the latter may be easily removed.

If desired, the cutter may be formed of two or more sections, instead of being in a single circular piece.

I am aware that it is not broadly new to provide a wheel with a removable cutting-flange or disk; but my improved cutter consists of a ring adapted to be clamped to the wheel without boring or altering the latter.

Having fully described my invention, what I claim as new, and desire to secure by Letters Patent, is—

1. The combination, with a wheel, of a removable cutter consisting of a ring adapted to be secured thereto by clamping devices bent to engage the felly of the wheel and bolted to said cutter, substantially as set forth.

2. The combination, with a wheel, of a removable cutter consisting of a ring adapted to be secured centrally upon the periphery of the wheel by means of two-part clamps bent to engage the felly of the wheel, the outer ends of said clamps being bolted to the cutter, substantially as set forth.

In testimony whereof I have signed this specification in the presence of two subscribing witnesses.

ROLLA L. MILLSPAUGH.

Witnesses:
H. E. SILLIMAN,
L. D. ZENOR.